Jan. 5, 1965  F. E. HURST  3,164,067
DEVICE FOR BAITING FISH HOOKS
Filed May 7, 1962
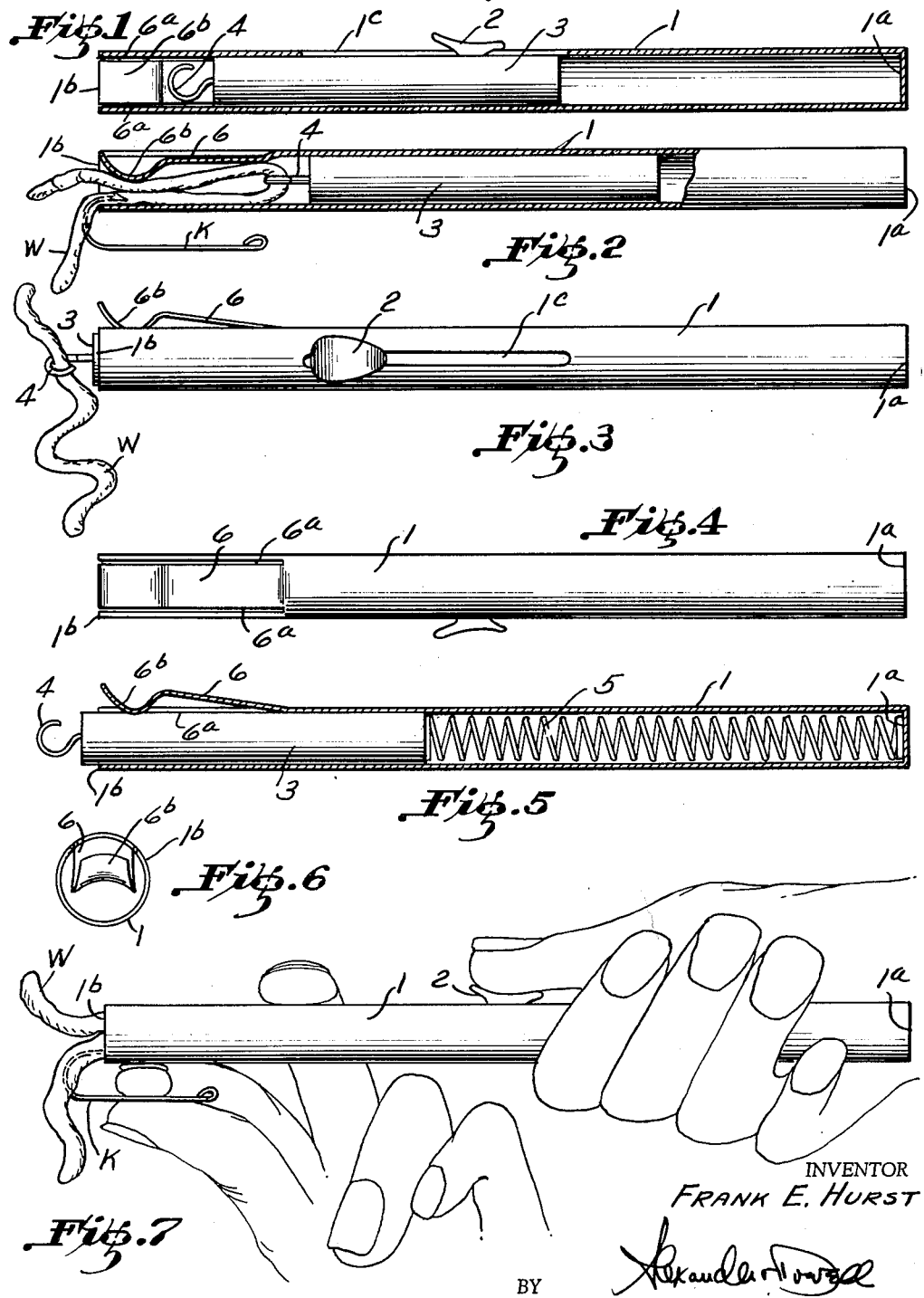
INVENTOR
FRANK E. HURST
BY
ATTORNEY

United States Patent Office 3,164,067
Patented Jan. 5, 1965

3,164,067
DEVICE FOR BAITING FISH HOOKS
Frank E. Hurst, 820 Piney Wood Drive, La Grange, Ga.
Filed May 7, 1962, Ser. No. 192,641
6 Claims. (Cl. 43—4)

This invention is a novel improvement in devices for baiting a worm or the like on a fishing hook, adapted to be used by fishermen and the like to enable them to more quickly bait the hook and particularly to bait the hook without necessitating the fisherman's hand touching the bait.

I will explain the invention with reference to the accompanying drawing, which illustrates several practical embodiments thereof, to enable others familiar with the art to adopt and use the same, and will summarize in the claims the novel features of construction, and novel combinations of parts, for which protection is desired.

In said drawing:

FIG. 1 is a longitudinal sectional view of the device, showing the plunger in normal retracted position within the casing;

FIG. 2 is an elevational view partly in section showing the plunger retracted within the casing with its hook engaging a worm which has been pulled into the outer end of the casing by the hook;

FIG. 3 is a top plan view of the device showing the plunger extended so that the hook projects beyond the open end of the casing and is engaged with a fishing worm or the like prior to retracting the plunger within the casing to draw the worm into its open end;

FIG. 4 is a plan view of the device looking down upon the flexible tongue of the casing;

FIG. 5 is a longitudinal section through the device showing a modification in which the plunger is spring-pressed to normally project the plunger out of the casing;

FIG. 6 is an enlarged end view of the device looking at the open end of the casing; and FIG. 7 is a view showing the device held in the hands of a fisherman in the act of inserting the fish hook into the worm or the like which has been drawn into the open end of the casing.

As shown, my novel baiting device comprises a casing 1 of desired length and of diameter sufficiently large to permit entry thereinto of the desired bait which may be a fishing worm W, or may be a cricket, grasshopper or other suitable bait. The casing 1 has a closed end 1a and an open end 1b. Extending through the casing wall, intermediate its ends, is a longitudinal slot 1c in which is slidably mounted a knob 2 which is adapted to be engaged by the thumb of the fisherman, knob 2 being secured to a plunger 3 slidably mounted in the casing 1, the slot 1c being of such length that the outer end of plunger 3 may be projected slightly beyond the open end 1b of casing 1, as clearly shown in FIGS. 3 and 5, but the plunger may be retracted within the casing 1 sufficiently to pull the worm partly into the open end thereof when the plunger is retracted within the tube, as shown in FIG. 2. On the outer end of plunger 3 is an open hook 4 adapted as shown in FIG. 3 to permit the hook 4 to engage the worm W when the plunger is projected out of the casing. When hook 4 is engaged with worm W as shown in FIG. 3, the plunger 3 may then be retracted within the casing by the thumb of the fisherman engaging knob 2, the worm then being drawn partly into the open end of casing 1 into the position shown in FIG. 2 so that a fishing hook K (FIGS. 2 and 7) may be readily engaged with worm W as shown in FIGS. 2 and 7 without the necessity of the hands of the fisherman touching the worm.

As shown in FIG. 5, if desired a spring 5 may be provided within the casing 1 with its ends engaging the inner end of plunger 3 and the closed end wall 1a of the casing 1, the spring 5 normally acting to project the plunger 3 out of the tube into the position shown in FIG. 5. The use of spring 5 is purely optional as my device may be used with or without said spring.

The wall of the casing 1, adjacent its open end 1b, is provided with a tongue 6 which is preferably but not necessarily struck out of the metal of the casing by forming two spaced parallel slits 6a (FIG. 4) extending longitudinally of the casing from the open end 1a thereof, the outer end portion of the tongue 6 being cupped inwardly as at 6b so as to normally substantially close the open end 1b of the casing thereby insuring that the worm W when partly positioned within the casing as shown in FIG. 2 will not be permitted any free movement within the open end of the tube, thus enabling the fishing hook K to be more readily engaged in the worm W. The tongue 6, however, being flexible will not interfere with the projecting and retracting movement of the plunger 3; and when plunger 3 is in retracted position as shown in FIG. 2, the worm will be pressed lightly against the wall of the casing 1 opposite from the tongue 6, but when the plunger 3 is projected as shown in FIGS. 3 and 5, offset portion 6b of the tongue will bear lightly upon the surface of plunger 3 and will be deflected into the position shown in FIGS. 3 and 5 permitting the plunger to be projected out of the open end 1b of the casing. Tongue 6 is normally in a down position as shown in FIG. 2 although it may rise somewhat in accordance with the size of the worm W or bait. The purpose of tongue 6 is to avoid any vacant space around the worm W within the casing 1, and the tongue 6 enables the device to be used effectively on any size of worm. The device will operate with slightly limited effectiveness without tongue 6, that is, with the wall of casing 1 continuing uniformly all the way to its end 1b. Thusly constructed the open end 1b of casing 1 will not vary in size as is caused by tongue 6 but will operate with slightly limited effectiveness just the same.

The diameter of the casing 1 is such that when the point of the fish hook K is held precisely at the open mouth 1b it will invariably penetrate the worm when the worm is forced out of the end of casing 1 by plunger 3 because there are no vacant spaces around the worm W in the open end of the casing which would prevent the hook from penetrating the worm. The plunger 3 obviously will be of sufficient diameter to prevent the worm from clogging between the walls of the cylinder and around the sides of the plunger 3. The "slimy" state of the worm makes it easy for the plunger 3 to push the worm out of the open end 1b of the casing 1, there being no friction to cause the worm to stick to the inner wall of the casing.

In using the device, the same as shown in FIG. 6, it would be held in either hand (right or left) and, with the thumb of the other hand on knob 2, the plunger 3 would be pushed forward until hook 4 is exposed beyond the open end 1b of casing 1, and the hook 4 then would be engaged around the worm W at about its middle section as shown in FIG. 3. Then the plunger 3 would be pulled back into the casing 1 by the fisherman's thumb on knob 2 to bring the worm into the position shown in FIG. 2, the worm being doubled up as it enters into the open end of the casing 1. Then the fisherman's hook K would be held at the mouth 1b of the casing 1 as shown in FIG. 7 and the point of the fish hook would be engaged with the worm at the position where the tongue 6 has the worm most closely confined as shown in FIG. 2 so that there would be little chance of the fish hook not penetrating the worm. Then the fisherman's thumb would be used to quickly push the plunger 3 outwardly of the casing, thereby pushing the worm onto the fish hook and pushing the baited fish hook K out of the end of the casing 1. If the spring 5 is incorporated into the device it is obvious that the user would not have to "push" with his thumb at this stage of operation. He would only have to release the plunger being held back with the thumb and the depressed spring would quickly force the plunger forward, forcing the worm onto the hook.

Instead of using a round casing and plunger 3 the same could be of any other desired cross section.

My device can also be used to grasp other types of bait besides ordinary fishing worms, such as grasshoppers, crickets and the like, though they may be too large to be pulled into the casing 1, since they could be held by placing the hook 4 over them and pulling same back against the open end 1b of the casing without causing the same to be drawn into the casing. While being held in this position, the user could readily insert the fish hook K without his hands ever touching the bait.

I do not limit my invention to the exact form shown in the drawing, for obviously changes may be made therein within the scope of the claims.

I claim:

1. A device for use in baiting fish hooks or the like, comprising a casing having an open end and having an elongated opening in its wall; a plunger slidable within the casing; means extending through said elongated opening for shifting the plunger into retracted position within the casing and into projected position wherein the outer end of the plunger projects beyond the open end of the casing; an open hook on the outer end of the plunger adapted when the latter is projected to be engaged with the bait and to pull same partially within the casing when the plunger is retracted; and means on the casing adjacent its open end for normally locally constricting the diameter of the casing and for yieldably engaging the bait when the plunger is retracted, the bait being forced out of the open end of the casing by the plunger when next projected and caused to be impinged upon a fish hook held stationary at the said open end.

2. In combination with a device as set forth in claim 1, means within the casing for normally urging the plunger into projected position.

3. In a device as set forth in claim 1, said constricting means comprising a resilient longitudinal tongue within the casing extending from a point intermediate the end of the casing toward the open end thereof and having its outer end adjacent the open end of the casing rounded and offset toward the opposite side of the casing from the tongue to normally engage the bait within the casing while permitting the plunger when projected to pass thereunder.

4. A device for use in baiting fish hooks or the like comprising a tubular casing having an open end and a closed end; and having longitudinal slot intermediate its ends; a plunger slidable within the casing; a knob on said plunger extending through said slot for shifting the plunger into retracted position within the casing and into projected position wherein the outer end of the plunger projects beyond the open end of the casing; an open hook on the outer end of the plunger adapted when projected to engage the bait and to pull same partially within the casing when the plunger is retracted; and means on the casing adjacent its open end for normally locally constricting the diameter of the casing and for yieldably engaging the bait when the plunger is retracted, whereby a fish hook may be readily penetrated into the bait disposed in the casing.

5. In combination with a device as set forth in claim 4, a spring interposed between the plunger and the closed end of the casing.

6. In a device as set forth in claim 4, said means comprising a resilient tongue struck out of the material of the casing between spaced parallel longitudinal slits extending from the open end of the casing, said tongue having its outer end rounded and offset toward the opposite side of the casing from the slits to normally engage the bait while permitting the plunger when projected to pass thereunder.

References Cited in the file of this patent

UNITED STATES PATENTS

| | | |
|---|---|---|
| 1,374,710 | Antanaviczius | Apr. 12, 1921 |
| 1,891,815 | Noppenz | Dec. 20, 1932 |
| 2,846,803 | Rettig | Aug. 12, 1958 |
| 2,886,932 | Davis | May 15, 1959 |

FOREIGN PATENTS

| | | |
|---|---|---|
| 171,314 | Austria | May 26, 1952 |